US010339842B2

(12) United States Patent
Ku

(10) Patent No.: US 10,339,842 B2
(45) Date of Patent: Jul. 2, 2019

(54) METHOD FOR FORMING THREE-DIMENSIONAL DECORATION ON WALL SURFACE, AND THREE-DIMENSIONAL DECORATION FORMED USING THE METHOD

(71) Applicant: Bon Joon Ku, Seoul (KR)

(72) Inventor: Bon Joon Ku, Seoul (KR)

( * ) Notice: Subject to any disclaimer, the term of this patent is extended or adjusted under 35 U.S.C. 154(b) by 20 days.

(21) Appl. No.: 15/646,500

(22) Filed: Jul. 11, 2017

(65) Prior Publication Data

US 2018/0018909 A1 Jan. 18, 2018

(30) Foreign Application Priority Data

Jul. 18, 2016 (KR) ........................ 10-2016-0090924

(51) Int. Cl.

| | |
|---|---|
| ***B32B 3/02*** | (2006.01) |
| ***G09F 19/22*** | (2006.01) |
| ***E04F 13/04*** | (2006.01) |
| ***E04F 13/08*** | (2006.01) |
| ***G09F 13/02*** | (2006.01) |

(52) U.S. Cl.
CPC .......... *G09F 19/226* (2013.01); *E04F 13/047* (2013.01); *E04F 13/0871* (2013.01); *G09F 13/02* (2013.01)

(58) Field of Classification Search
CPC ............................ E04F 13/047; E04F 13/0871
See application file for complete search history.

(56) References Cited

U.S. PATENT DOCUMENTS 1,659,056 A * 2/1928 Simmons .................. B44C 3/04 427/198
2004/0250488 A1* 12/2004 Rodlin .................. B44C 5/0461 52/415

FOREIGN PATENT DOCUMENTS

| | | |
|---|---|---|
| KR | 10-0375784 B1 | 6/2003 |
| KR | 10-0675084 B1 | 1/2007 |
| KR | 10-0791755 B1 | 1/2008 |
| KR | 10-1293437 B1 | 8/2013 |
| KR | 10-1591019 B1 | 2/2016 |

* cited by examiner

*Primary Examiner* — Elizabeth E Mulvaney
(74) *Attorney, Agent, or Firm* — KORUS Patent, LLC; Seong Il Jeong

(57) ABSTRACT

There is provided a method for forming a three-dimensional decoration on a wall surface, wherein the method comprises: drawing a sketch on the work wall-surface; installing a crack-prevention member on the work wall-surface to suppress a separation between the three-dimensional decoration and the wall surface, wherein the crack-prevention member is disposed in a first region corresponding to the sketch; plastering a cement-mortar in the first region on the work wall-surface so as to embed the crack-prevention member in the cement-mortar, thereby to form a cement-mortar relief; three-dimensionally engraving a front face portion of the cement-mortar relief to form a cement-mortar relief-type decoration as the three-dimensional decoration; and coloring the cement-mortar relief-type decoration using a mixture of silicon as a binder and coloring pigments.

4 Claims, 8 Drawing Sheets

METHOD FOR FORMING THREE-DIMENSIONAL DECORATION ON WALL SURFACE, AND THREE-DIMENSIONAL DECORATION FORMED USING THE METHOD

BACKGROUND

Field of the Present Disclosure

The present disclosure relates to a method for forming a three-dimensional decoration on a wall surface, and a three-dimensional decoration formed using the method. More particularly, the present disclosure relates to a method for forming a three-dimensional decoration on a wall surface wherein the three-dimensional decoration has various and complex designs and is formed without a mold.

Discussion of Related Art

In terms of urban beauty or building value, the wall of a building or a boundary-defining wall may be beautifully decorated. The most typical method for the decoration is to paint the boundary-defining wall or the wall of the building.

However, when painting the boundary-defining wall or the wall of the building, the wall or wall of the building is decorated in a flat manner. This flat manner may not realize three-dimensional decoration. Thus, a three-dimensional decoration method may be used to decorate the wall more beautifully.

The three-dimensional decoration method is to form a three-dimensional decorative pattern on a wall. Conventionally, a three-dimensional ornament object is separately manufactured and then attached to a wall or a wall.

However, in order to produce a three-dimensional ornament object, a separate mold is manufactured and the three-dimensional ornament object is formed by using the mold. In addition, since the three-dimensional ornament object needs to be transported to an installation site thereof, an additional cost is incurred.

Particularly, when the three-dimensional ornament object is large, the mold to form the three-dimensional ornament object has a larger size. This leads to a larger cost to form the mold. In addition, it takes more labor and logistic cost to transfer the manufactured ornament object to the installation site.

Moreover, when the three-dimensional ornament object has a complex and elaborate shape, it may be difficult to form the three-dimensional ornament object using a mold.

It should be understood that the foregoing description in this background section is merely for the purpose of promoting an understanding of the background of the present disclosure and is not to be construed as an admission that the foregoing description is considered as a prior art as known to those skilled in the art.

PRIOR ART DOCUMENT

Patent Document (Patent Document 1) Korean Patent No. 10-0791755 (Dec. 27, 2007)

(Patent Document 2) Korean Patent No. 10-0675084 (Jan. 22, 2007)

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a method for forming a three-dimensional decoration on a wall surface wherein the three-dimensional decoration has various and complex designs and is formed with a cement plastering technique without a mold. Further, the present disclosure is to provide a three-dimensional decoration formed using the method.

In a first aspect of the present disclosure, there is provided a method for forming a three-dimensional decoration on a wall surface, wherein the method comprises: removing a dust from a work wall-surface; planarizing the work wall-surface by plastering a cement on the work wall-surface or by grinding the work wall-surface; drawing a sketch on the work wall-surface, wherein the sketch has a shape corresponding to the three-dimensional decoration; installing a crack-prevention member on the work wall-surface to suppress a separation between the three-dimensional decoration and the wall surface, wherein the crack-prevention member is embodied as a metal mesh, wherein the crack-prevention member is disposed in a first region corresponding to the sketch; plastering a cement-mortar in the first region on the work wall-surface so as to embed the crack-prevention member in the cement-mortar, thereby to form a cement-mortar relief; trimming a peripheral edge of the cement-mortar relief in a corresponding manner to a contour of the sketch; three-dimensionally engraving a front face portion of the cement-mortar relief to form a cement-mortar relief-type decoration as the three-dimensional decoration; and coloring the cement-mortar relief-type decoration using a mixture of silicon as a binder and coloring pigments.

In one implementation of the first aspect, the method further comprises installing an illumination device around the work wall-surface.

In a second aspect of the present disclosure, there is provided a three-dimensional decoration on a wall surface, wherein the three-dimensional decoration includes the three-dimensional decoration formed by the method of the first aspect.

In one implementation of the second aspect, an illumination device is disposed around the work wall-surface.

According to the present disclosure, the cement-mortar relief-type decoration is formed using a cement plastering technique. Since the cement-mortar relief-type decoration is directly formed on the work wall-surface at a work site, a mold for molding a three-dimensional ornamental object is not required. Thus, this may save the mold forming cost.

In addition, there is no logistical cost to transfer the three-dimensional ornamental object to the installation site. Further, the present disclosure allows easy formation of the cement-mortar relief-type decoration, which is difficult to form using a mold.

Unlike the prior art, there is no need for costly and time-consuming labor for molding the three-dimensional ornament and transporting the ornament to the work site. In particular, the cement-mortar relief-type decoration may be formed in an elaborate and complex form that is difficult to mold using a mold. Therefore, according to the demand of the consumer, it is possible to decorate the wall with various designs without limitation of the design.

Further, since the crack-prevention member is installed, the cement-mortar relief-type decoration is not likely to have cracks or to be separated from the wall face.

Moreover, when the mixture of the silicon and the pigments is used for the coloring, a colored layer may be rendered clearer, may be less changed, and may be less likely to be peeled off, as compared to a color layer using the cement paint.

DETAILED DESCRIPTIONS

Figure 1:
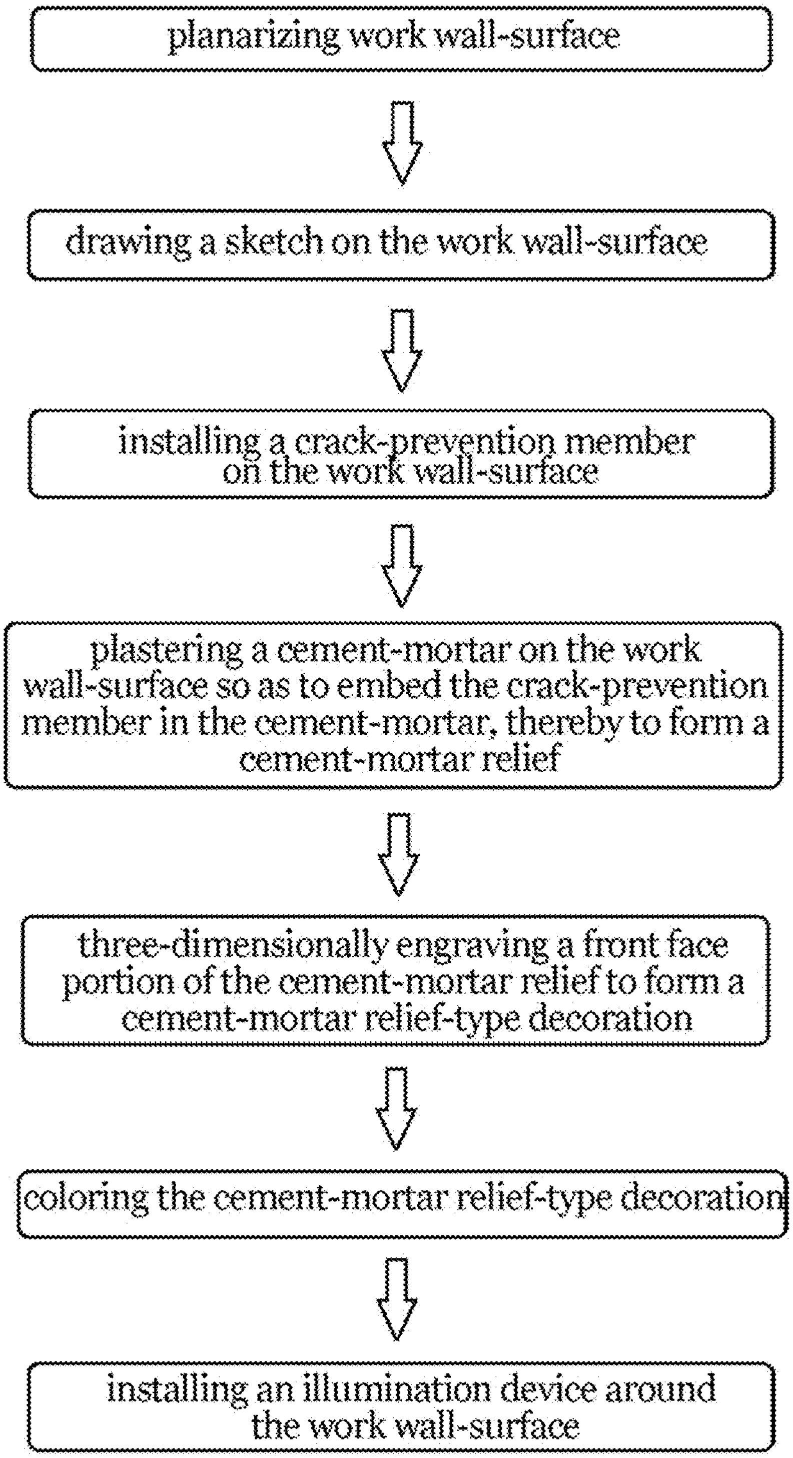
FIG. 1 is a flowchart of a method for forming a three-dimensional decoration on a wall surface, according to a preferred embodiment of the present disclosure.

Examples of various embodiments are illustrated and described further below. It will be understood that the description herein is not intended to limit the claims to the specific embodiments described. On the contrary, it is intended to cover plate alternatives, modifications, and equivalents as may be included within the spirit and scope of the present disclosure as defined by the appended claims.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

FIG. 1 is a flowchart showing a working process according to a preferred embodiment of the present disclosure. As shown in the drawing, the present disclosure includes following operations:

1) Planarization of a Work Wall-Surface

A dust attached to the work wall-surface to be worked on is removed. When the work wall-surface is uneven, a cement may be plastered on the work wall-surface or the work wall-surface may be ground. This allows the work wall-surface to be planarized.

2) Drawing a Sketch on the Work Wall-Surface

Figure 2:
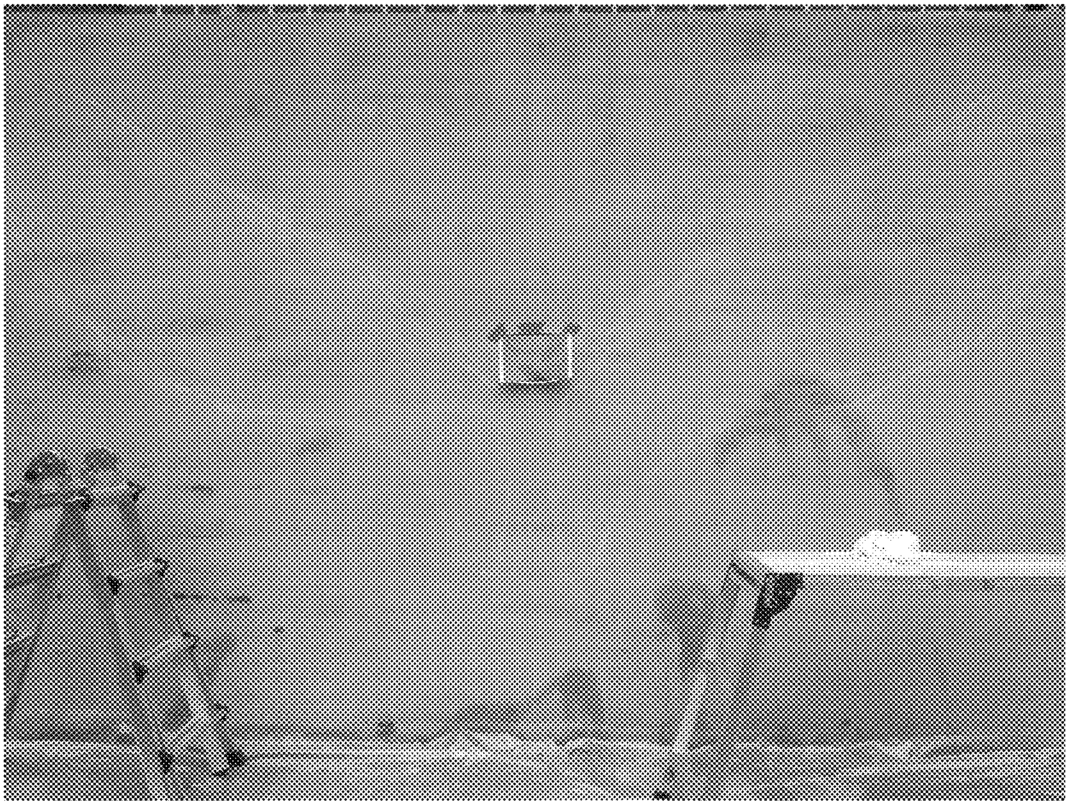
FIG. 2 to FIG. 7 are photographs showing operations of a method for forming a three-dimensional decoration on a wall surface, according to a preferred embodiment of the present disclosure.
Figure 3:
Figure 4:
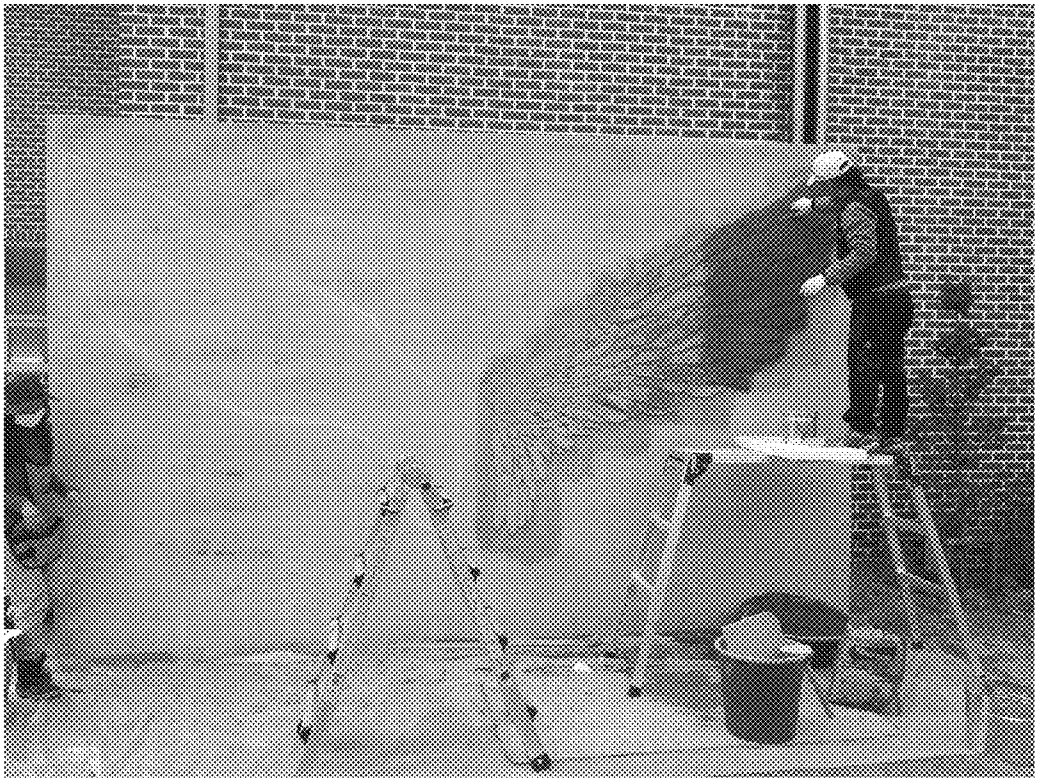
Figure 5:
Figure 6:

A sketch may be drawn on the planarized work wall-surface. FIG. 2 is a photograph showing a state in which the sketch is drawn on the work wall-surface.

3) Installing a Crack-Prevention Member on the Work Wall-Surface

A crack-prevention member is installed on the sketch region, that is, a region corresponding to a cement-mortar relief-type decoration. A metal mesh such as a metal lath or a fiber mesh may be used as the crack-prevention member. The crack-prevention member may be fixed to the work wall-surface with an anchor or a nail.

The crack-prevention member is intended to prevent cracks in the cement-mortar relief-type decoration made of a cement-mortar, as described below, thereby to prevent separation of the cement-mortar relief-type decoration from the work wall-surface.

In one embodiment, the crack-prevention member may be attached over an entirety of the sketch area and then the cement-mortar may be plastered on the entirety of the sketch area. In another embodiment, the crack-prevention member is attached over only a portion of the sketch region, and the cement-mortar is applied to the region where the crack-prevention member is installed, and then, the crack-prevention member is attached over a remaining portion of the sketch region where the crack-prevention member was not installed, and, then, the cement-mortar is applied to the remaining portion.

4) Plastering the Cement-Mortar on the Sketch Region

The cement-mortar is plastered on the sketch region. Using a trowel, the cement-mortar may be applied. Thus, as the cement-mortar is plastered, a cement-mortar relief is formed on the work wall-surface, while the crack-prevention member is embedded in the cement-mortar relief.

If necessary, a mortar adhesion enhancer may be applied over the crack-prevention member, and then, the cement-mortar may be applied thereto.

5) Engraving a Pattern in the Cement-Mortar Relief

A peripheral edge of the resulting cement-mortar relief is then trimmed to match a contour of the sketch. A front face portion of the cement-mortar relief is three-dimensionally carved according to a target design. Of course, if the cement-mortar is finely formed to match a shape of the sketch at the operation of plastering the cement-mortar, it may not be necessary to trim the periphery of the cement-mortar relief or carve the front face portion thereof. However, it is difficult to finely form the cement-mortar in a shape corresponding to the sketch using the trowel.

This engraving operation may be performed using a tool such as a caulking hera or a sculpting knife.

On the other hand, when the cement-mortar relief is hardened, it is difficult to scrape the cement-mortar relief. Thus, the cement-mortar relief must be scraped before the hardening of the cement-mortar relief. In one embodiment, a cement-mortar may be plastered over only a first portion of the sketch, and then a first cement-mortar relief may be formed and carved. Then, a cement-mortar may be plastered over only a second portion of the sketch, and then a second cement-mortar relief may be formed and carved. Then, a cement-mortar may be plastered over only a third portion of the sketch, and then a third cement-mortar relief may be formed and carved. This process may be repeated until a shape corresponding to the entire sketch is completed.

This iterative approach may also be applied to the crack-prevention member. Thus, a first crack-prevention member may be installed over only a first portion of the sketch, and then, a cement-mortar may be plastered over only the first portion of the sketch, and then a first cement-mortar relief may be formed and carved. Then, a second crack-prevention member may be installed over only a second portion of the sketch, and then, a cement-mortar may be plastered over only the second portion of the sketch, and then a second cement-mortar relief may be formed and carved. Then, a third crack-prevention member may be installed over only a third portion of the sketch, and then, a cement-mortar may be plastered over only the third portion of the sketch, and then a third cement-mortar relief may be formed and carved. This process may be repeated until a shape corresponding to the entire sketch is completed.

FIG. 2 shows a sketch operation. FIG. 3 to FIG. 6 show the following repetitive operations: a first crack-prevention member may be installed over only a first portion (a lower portion of a right wing) of the sketch, and then, a cement-mortar may be plastered over only the first portion of the sketch, and then a first cement-mortar relief may be formed and carved. Then, a second crack-prevention member may be installed over only a second portion (an upper portion of the right wing) of the sketch, and then, a cement-mortar may be plastered over only the second portion of the sketch, and then a second cement-mortar relief may be formed and carved. Then, a third crack-prevention member may be installed over only a third portion (a lower portion of a left wing) of the sketch, and then, a cement-mortar may be plastered over only the third portion of the sketch, and then a third cement-mortar relief may be formed and carved. Then, a fourth crack-prevention member may be installed over only a fourth portion (an upper portion of the left wing) of the sketch, and then, a cement-mortar may be plastered over only the fourth portion of the sketch, and then a fourth cement-mortar relief may be formed and carved. As shown, the entire wings may be completed. In this way, the cement-mortar relief-type decoration may be formed.

6) Coloring the Cement-Mortar Relief-Type Decoration

The resulting cement-mortar relief-type decoration may be painted. In this operation, the background of the work wall-surface may also be painted. The cement-mortar relief-type decoration may be painted after it has been completely dried.

The cement-mortar relief-type decoration may be painted using ordinary cement paint. Preferably, coloring pigments may be used to color the cement-mortar relief-type decoration according to one embodiment of the disclosure. Silicon may be added as a binder into the coloring pigments. When the mixture of the silicon and the pigments as described above is used, a colored layer may be rendered clearer, may be less changed, and may be less likely to be peeled off, as compared to a color layer using the cement paint.

Figure 7:

In this connection, FIG. 7 is a photograph showing that the cement-mortar relief-type decoration and the background of the work wall-surface are colored.

7) Installing an Illumination Device Around the Work Wall-Surface

Figure 8:
FIG. 8 is a photograph showing a state in which a three-dimensional decoration is illuminated by an illumination device.

Once the coloring is complete as described above, the illumination device may be installed around the work wall-surface. In this embodiment, as shown in FIG. 7, the illumination device is installed at a top of the work wall-surface. FIG. 8 is a photograph showing the state of illuminating the work wall-surface by turning on the illumination device.

With this illumination device, the work wall-surface may be decorated more beautifully. In particular, as the illumination device illuminates the work wall-surface at night, a different mood may be produced from the daytime mood. In addition, the illumination device may function as a streetlight.

According to the present disclosure, the cement-mortar relief-type decoration is formed using a cement plastering technique. Since the cement-mortar relief-type decoration is directly formed on the work wall-surface at a work site, a mold for molding a three-dimensional ornamental object is not required.

Unlike the prior art, there is no need for costly and time-consuming labor for molding the three-dimensional ornament and transporting the ornament to the work site. In particular, the cement-mortar relief-type decoration may be formed in an elaborate and complex form that is difficult to mold using a mold. Therefore, according to the demand of the consumer, it is possible to decorate the wall with various designs without limitation of the design.

Although the embodiments of the present disclosure have been described with reference to the accompanying drawings, it will be understood by those skilled in the art that various changes in form and details may be made therein without departing from the spirit and scope of the disclosure as defined by the appended claims. It will be appreciated that the disclosure may be embodied in other specific forms.

Accordingly, it should be understood that the above-described embodiments are illustrative in all aspects and not restrictive. The scope of the present disclosure is defined by the appended claims rather than the foregoing description. It is intended that the present disclosure cover the modifications and variations of this disclosure provided they come within the scope of the appended claims and their equivalents.

What is claimed is:

1. A method for forming a three-dimensional decoration on a wall surface, wherein the method comprises:

removing a dust from a work wall-surface of a building or a boundary wall;

planarizing the work wall-surface by plastering a cement on the work wall-surface or by grinding the work wall-surface;

drawing a sketch on the work wall-surface, wherein the sketch has a shape corresponding to the three-dimensional decoration;

installing a crack-prevention member on the work wall-surface to suppress a separation between the three-dimensional decoration and the wall surface, wherein the crack-prevention member is embodied as a metal mesh, wherein the crack-prevention member is disposed in a first region corresponding to the sketch;

plastering a cement-mortar in the first region on the work wall-surface so as to embed the crack-prevention member in the cement-mortar, thereby to form a cement-mortar relief;

trimming a peripheral edge of the cement-mortar relief in a corresponding manner to a contour of the sketch;

three-dimensionally engraving a front face portion of the cement-mortar relief to form a cement-mortar relief-type decoration as the three-dimensional decoration; and coloring the cement-mortar relief-type decoration using a mixture of silicon as a binder and coloring pigments.

2. The method of claim 1, further comprising, installing an illumination device around the work wall-surface.

3. A three-dimensional decoration on a wall surface, wherein the three-dimensional decoration includes the three-dimensional decoration formed by the method of claim 1.

4. The three-dimensional decoration of claim 3, wherein an illumination device is disposed around the work wall-surface.

* * * * *